(No Model.)
L. R. CLARK.
AUTOMATIC BRAKE FOR VEHICLES.
No. 404,075. Patented May 28, 1889.
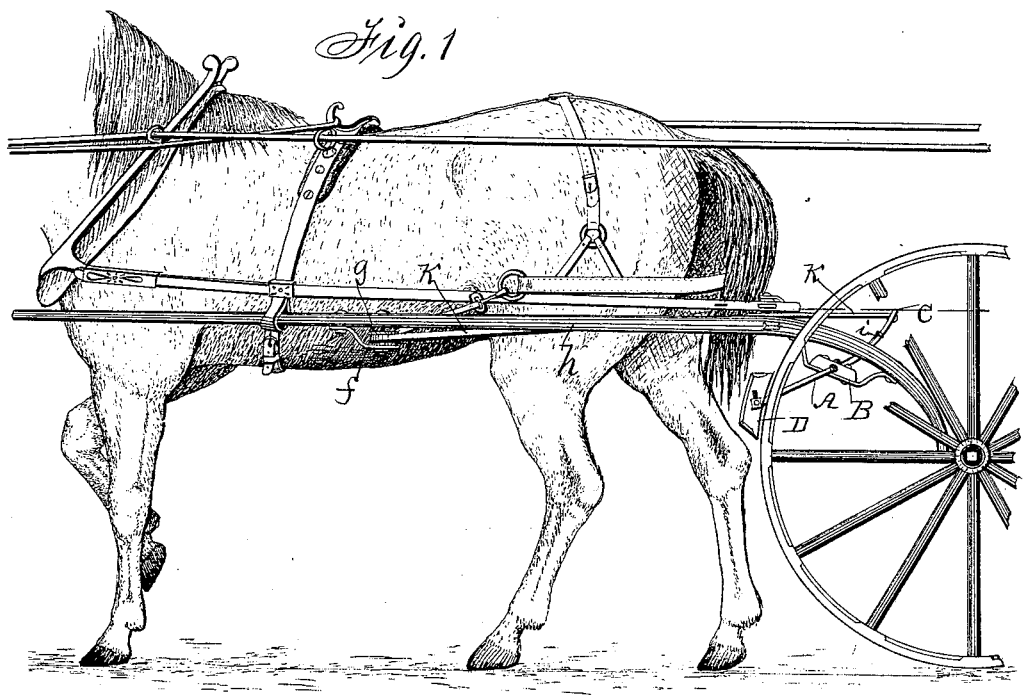
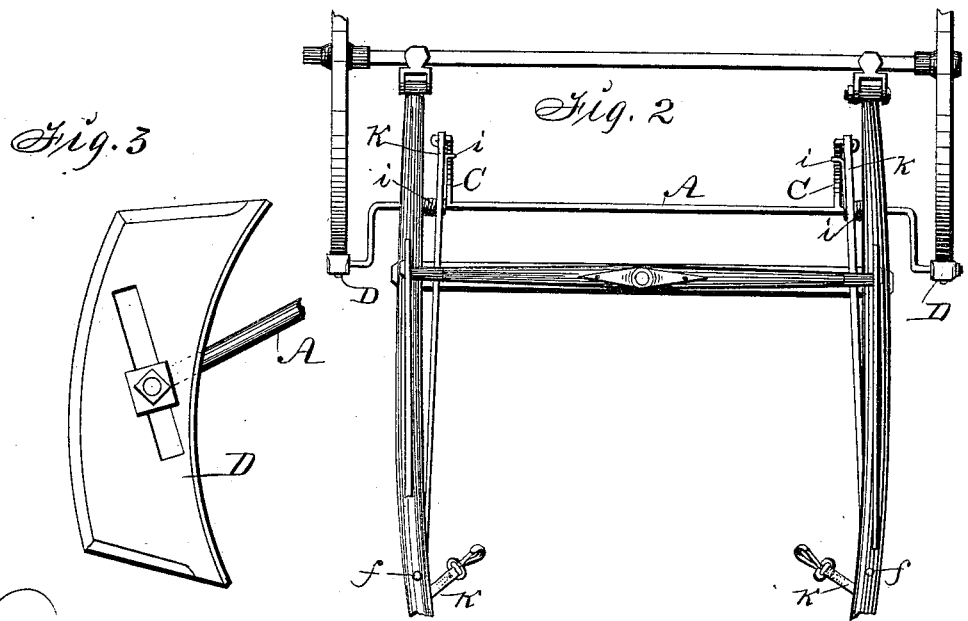
Witnesses:
W. M. Black
J. C. Tate
Inventor:
Leander R. Clark
By Thomas G. Orwig, Attorney

UNITED STATES PATENT OFFICE.

LEANDER R. CLARK, OF ALBIA, IOWA.

AUTOMATIC BRAKE FOR VEHICLES.

SPECIFICATION forming part of Letters Patent No. 404,075, dated May 28, 1889.

Application filed August 13, 1888. Serial No. 282,694. (No model.)

*To all whom it may concern:*

Be it known that I, LEANDER R. CLARK, a citizen of the United States of America, and a resident of Albia, in the county of Monroe and State of Iowa, have invented an Automatic Brake for Phaetons, &c., of which the following is a specification.

My object is to prevent the jarring, dangers, and accidents incident to driving across gutters and down grades with a single horse hitched in the shafts of a vehicle.

My invention consists in the construction and combination of a brake device with the shafts of a vehicle, so that harness holdback-straps can be connected with the brake in such a manner that a backing motion of the horse or a forward pressure of the vehicle upon the horse will cause the brake-shoes to engage the front carriage-wheels, as required, to arrest the forward motion of the vehicle.

Figure 1 of the accompanying drawings is a side view showing my device applied to a vehicle as required for practical use. Fig. 2 is a top view of the device combined with shafts and a pair of holdback-straps attached. Fig. 3 is an enlarged view of a brake-shoe specially adapted to be used in my device.

A is a rock-shaft that has double elbows at its ends adapted for carrying friction-blocks or brake-shoes.

B B are bearings attached to the shafts in rear of the singletree to support the shaft A.

C C are arms projecting rearward and upward from the rock-shaft A. They terminate in hooks or fastening devices adapted for connecting holdback-straps therewith.

D D are friction-blocks or brake-shoes attached to the ends of the rock-shaft A. They are provided with inclined slots, as clearly shown in Fig. 3, through which the screw-threaded ends of the shaft A are passed and secured, by means of washers and nuts, in such a manner that when they come in contact with the wheels of a vehicle they will arrest their forward motions, but not impede their backward movements, because the forward movement of a wheel will draw the brake-shoe downward as required to clamp the wheel, and a reverse movement will elevate the shoe as required to prevent friction on the wheel.

*f f* are holdback-irons provided with anti-friction pulleys *g*, and fixed to the under sides of the side pieces, *h*, of the shafts.

*i i* are springs fixed to the shafts in such a manner that they will in their normal condition keep the holdback-straps stretched and the brake-shoes off the wheels.

*k k* are holdback-straps attached to the arms C of the rock-shaft A and then passed inward around the pulleys *g*, and from thence backward, to be detachably connected with the breeching of the harness, by means of snap-hooks, buckles, or in any suitable way, in such a manner that a backward motion of a horse will draw upon the holdback-straps and thereby pull the arms C of the rock-shaft forward as required to bring the brake-shoes in contact with the carriage-wheels to arrest their forward movements. The same result occurs when the horse is descending a down-grade and the vehicle is by force of gravity pressing forward and inclined to go faster than the horse.

I am aware that back bars or levers having brakes on their ends have been connected with the shafts of vehicles, to be operated by means of straps connected with the harness of a horse hitched to the vehicle; but my manner of constructing a rock-shaft having elbows at its ends and arms at its end portions, and combining it with the shafts of a vehicle, so that the holdback-strap of a harness on a horse can be connected with the shafts and the arms of the rock-shaft for the purpose of advancing and also holding back the vehicle, is novel and greatly advantageous.

I claim as my invention—

An automatic brake device for vehicles, comprising a rock-shaft, A, having arms C and brake-shoes on its free ends, springs *i*, and harness holdback-straps, in combination with shafts having holdback-irons *f*, and anti-friction pulleys *g*, to operate substantially as shown and described.

LEANDER R. CLARK.

Witnesses:
   J. CARL VARNER,
   D. A. NOBLE.